US009571238B2

(12) United States Patent
Gao et al.

(10) Patent No.: US 9,571,238 B2
(45) Date of Patent: Feb. 14, 2017

(54) CONTROL CHANNEL RESOURCE TRANSMISSION METHOD, BASE STATION AND USER EQUIPMENT

(71) Applicant: HUAWEI TECHNOLOGIES CO., LTD., Shenzhen, Guangdong (CN)

(72) Inventors: Chi Gao, Beijing (CN); Jianghua Liu, Beijing (CN); Qiang Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 84 days.

(21) Appl. No.: 14/455,050

(22) Filed: Aug. 8, 2014

(65) Prior Publication Data

US 2014/0355559 A1 Dec. 4, 2014

Related U.S. Application Data

(63) Continuation of application No. PCT/CN2013/071607, filed on Feb. 16, 2013.

(30) Foreign Application Priority Data

Feb. 10, 2012 (CN) .......................... 2012 1 0030103

(51) Int. Cl.
*H04L 5/00* (2006.01)
*H04B 7/06* (2006.01)
(Continued)

(52) U.S. Cl.
CPC ........... *H04L 5/0005* (2013.01); *H04B 7/0697* (2013.01); *H04L 5/0053* (2013.01);
(Continued)

(58) Field of Classification Search
None
See application file for complete search history.

(56) References Cited

U.S. PATENT DOCUMENTS

2011/0116455 A1 5/2011 Damnjanovic et al.
2013/0039284 A1* 2/2013 Marinier ................ H04L 5/001
370/329
(Continued)

FOREIGN PATENT DOCUMENTS

CN 101222260 A 7/2008
CN 101478379 A 7/2009
(Continued)

OTHER PUBLICATIONS

Extended and Supplementary European Search Report issued on Nov. 10, 2014 in corresponding European Patent Application No. 13746059.8.
(Continued)

*Primary Examiner* — Kodzovi Acolatse
(74) *Attorney, Agent, or Firm* — Staas & Halsey LLP

(57) ABSTRACT

Embodiments of the present invention provide a control channel resource transmission method, a base station and a user equipment which can ensure balance between performance of E-CCEs on a resource set, and further ensure scheduling and receiving performance of the E-CCEs. A control channel resource transmission method includes: mapping, by a base station, more than one enhanced control channel element E-CCE onto a resource set, where each E-CCE is mapped onto a corresponding first resource subset and a corresponding second resource subset respectively, so that each E-CCE occupies a resource of the same size or a difference between sizes of resources occupied by the E-CCEs is less than a preset threshold, where the E-CCEs are carried on the resource set for transmission; and transmitting the resource set that carries the E-CCEs to a user equipment; and demodulating, by the user equipment, the resource set and performing receiving.

16 Claims, 6 Drawing Sheets

(51) Int. Cl.
*H04W 72/04* (2009.01)
*H04W 72/12* (2009.01)

(52) U.S. Cl.
CPC ... *H04W 72/0413* (2013.01); *H04W 72/0446* (2013.01); *H04W 72/0453* (2013.01); *H04W 72/1273* (2013.01); *H04L 5/006* (2013.01); *H04L 5/0058* (2013.01)

(56) References Cited

U.S. PATENT DOCUMENTS

| | | | | |
|---|---|---|---|---|
| 2013/0083769 | A1* | 4/2013 | Qu | H04L 5/0016 370/330 |
| 2013/0100901 | A1* | 4/2013 | Shan | H04L 5/0048 370/329 |
| 2013/0215842 | A1* | 8/2013 | Han | H04W 72/042 370/329 |
| 2013/0242817 | A1* | 9/2013 | He | H04L 5/1469 370/280 |

FOREIGN PATENT DOCUMENTS

| | | |
|---|---|---|
| CN | 102612094 A | 7/2012 |
| WO | WO 2008/111808 A1 | 9/2008 |
| WO | WO 2010/101411 A2 | 9/2010 |

OTHER PUBLICATIONS

Nokia, Nokia Siemens Networks, "Multiplexing of E-PDCCH for different users", 3GPP TSG RAN WG1 Meeting #68, Dresden, Germany, Feb. 6-10, 2012, 4 Pages.
Qualcomm Incorporated, "Multiplexing of Different DCI messages for e-PDCCH", 3GPP TSG RAN WG1 #68, Dresden Germany, Feb. 6-10, 2012, 2 Pages.
LG Electronics, "Concept of E-PDCCH CCE", 3GPP TSG RAN WG1 Meeting #68, Dresden, Germany, Feb. 6-10, 2012, 3 Pages.
Fujitsu, "Overview of Multiplexing of DCI Formats for Localised and Distributed E-PDCCH Transmissions", 3GPP TSG-RAN WG1#68, Dresden, Germany, Feb. 6-10, 2012, pp. 1-5.
International Search Report issued on May 23, 2013 in corresponding International Patent Application No. PCT/CN2013/071607.
International Search Report, dated May 23, 2013, in corresponding International Application No. PCT/CN2013/071607 (5 pp.).
Chinese Office Action dated Apr. 27, 2015 in corresponding Chinese Patent Application No. 201210030103.3.
Samsung, "Resource multiplexing of E-PDCCH", 3GPP TSG RAN WG1 #67, San Francisco, USA, Nov. 2011, pp. 1-3.

* cited by examiner

A base station maps more than one E-CCE onto a resource set, where each E-CCE is mapped onto a corresponding first resource subset and a corresponding second resource subset respectively, the first resource subset occupies a first time domain symbol set in a time domain and occupies a first preset frequency domain subcarrier set in a frequency domain, and the second resource subset occupies a second time domain symbol set in the time domain and occupies a second preset frequency domain subcarrier set in the frequency domain, so that each E-CCE occupies a resource of the same size or a difference between sizes of resources occupied by the E-CCEs is less than a preset threshold, where the E-CCEs are carried on the resource set for transmission — S101

The base station transmits the resource set that carries the E-CCEs to a user equipment — S102

FIG. 1

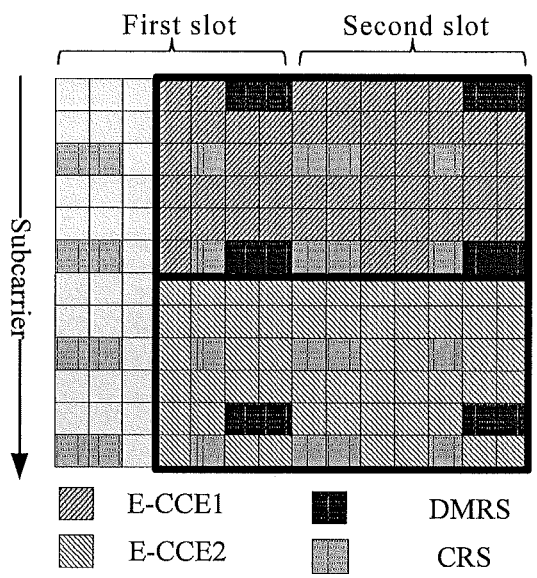

FIG. 2

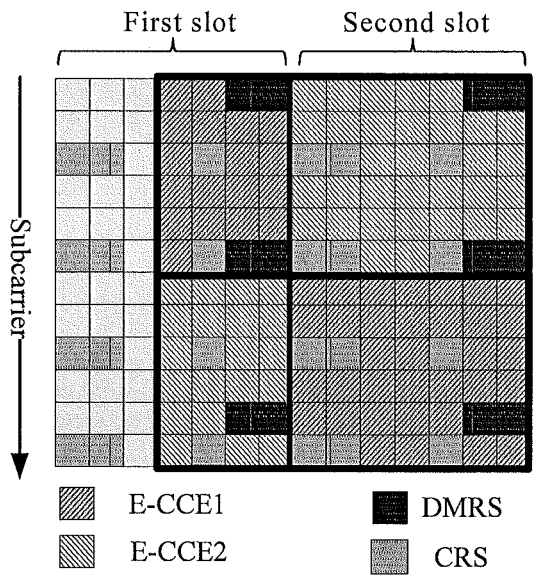

FIG. 3

A base station maps more than one E-CCE onto an RB pair, where each E-CCE is mapped onto a corresponding first resource subset and a corresponding second resource subset respectively, the first resource subset occupies a first time domain symbol set in a time domain, the first time domain symbol set is the first slot of the RB pair, a second preset subcarrier set belongs to the second slot of the RB pair, the first resource subset occupies a first preset frequency domain subcarrier set in a frequency domain, and the second resource subset occupies a second preset frequency domain subcarrier set in the frequency domain, where the first slot does not overlap the second slot, and the first preset frequency domain subcarrier set does not overlap the second preset frequency domain subcarrier set ⟶ S201

The base station transmits an RB pair that carries the E-CCEs to a user equipment ⟶ S202

FIG. 4

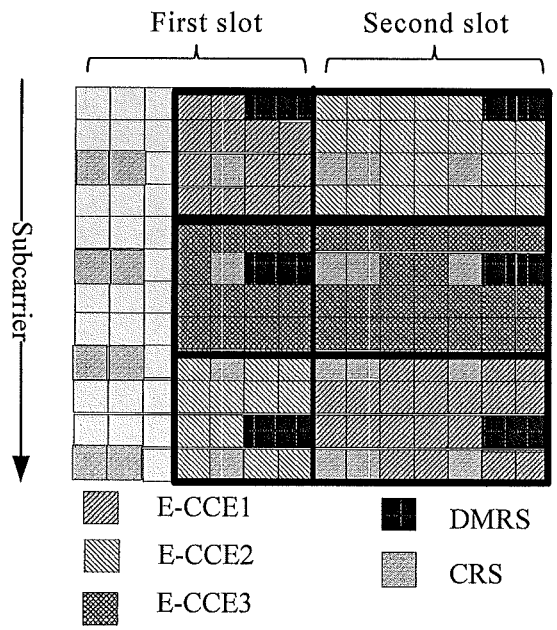

FIG. 7

| A user equipment demodulates more than one E-CCE mapped onto a resource set, where the E-CCEs are demodulated on a first resource subset and a second resource subset corresponding to each E-CCE separately, the first resource subset occupies a first time domain symbol set in a time domain and occupies a first preset frequency domain subcarrier set in a frequency domain, and the second resource subset occupies a second time domain symbol set in the time domain and occupies a second preset frequency domain subcarrier set in the frequency domain, so that each E-CCE occupies a resource of the same size or a difference between sizes of resources occupied by the E-CCEs is less than a preset threshold, where the E-CCEs are carried on the resource set for transmission |
|---|

S301

| According to the demodulated E-CCEs, the user equipment receives the resource set that carries the E-CCEs and is transmitted by the base station |
|---|

A user equipment demodulates each corresponding E-CCE on a first resource subset and a second resource subset corresponding to each E-CCE respectively in an RB pair, where a first preset frequency domain subcarrier set belongs to the first slot of the resource set, the first resource subset occupies the first slot of the RB pair in a time domain and occupies the first preset frequency domain subcarrier set in a frequency domain, the second resource subset occupies the second slot of the RB pair in the time domain and occupies the second preset frequency domain subcarrier set in the frequency domain, the first preset frequency domain subcarrier set does not overlap the second preset frequency domain subcarrier set, the first slot does not overlap the second slot, and the E-CCE is carried on the RB pair for transmission ⟶ S401

According to the demodulated E-CCEs, the user equipment receives the RB pair that carries the E-CCEs and is transmitted by the base station ⟶ S402

FIG. 9

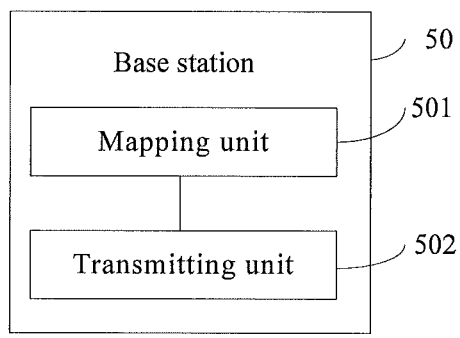

FIG. 10

CONTROL CHANNEL RESOURCE TRANSMISSION METHOD, BASE STATION AND USER EQUIPMENT

CROSS-REFERENCE TO RELATED APPLICATIONS

This application is a continuation of International Application No. PCT/CN2013/071607, filed on Feb. 16, 2013, which claims priority to Chinese Patent Application No. 201210030103.3, filed on Feb. 10, 2012, both of which are hereby incorporated by reference in their entireties.

TECHNICAL FIELD

The present invention relates to the communications field, and in particular, to a control channel resource transmission method, a base station and a user equipment.

BACKGROUND

In downlink transmission of a Long Term Evolution (LTE for short) communication system, a base station such as an eNB (evolved NodeB) transmits a PDSCH (physical downlink shared channel) and a corresponding PDCCH (physical downlink control channel) to each scheduled user equipment according to a scheduling result.

The PDSCH carries data transmitted by the eNB to the scheduled user equipment, and the PDCCH carries scheduling information of the PDSCH corresponding to the PDCCH. The scheduling information is primarily used to indicate transmission format information of the PDSCH corresponding to PDCCH. The PDCCH and the PDSCH are multiplexed in a subframe in a time division manner. The PDCCH is transmitted in the first several OFDM (orthogonal frequency division multiplexing) symbols of the subframe, and the remaining OFDM symbols are used to transmit the PDSCH. In a subframe, the PDCCH of all scheduled user equipments is multiplexed together, and then are transmitted in a PDCCH region; and the PDSCH is transmitted in a PDSCH region, where both the PDCCH and the PDSCH have a specific time domain and a specific frequency domain. The PDCCH region refers to a region occupied by the PDCCH in the time domain and the frequency domain, and the PDSCH region is a region occupied by the PDSCH in the time domain and the frequency domain.

In further evolution of the LTE system, MU-MIMO (multi-user multi-input multi-output) and CoMP (coordinated multi-point transmission) need to be supported to improve system performance, and other similar technologies need to be applied. As a result of such technologies, the number of user equipments that need to be scheduled simultaneously increases. However, the capacity of a PDCCH is limited, which restricts the number of user equipments that can be scheduled in one subframe. Therefore, the prior art enhances the PDCCH, and a part of resources of the original PDSCH region is allocated for transmitting the enhanced PDCCH, that is, an E-PDCCH (Enhanced-Physical Downlink Control Channel). In this way, the capacity of the PDCCH control channel is improved, that is, the number of user equipments scheduled simultaneously is increased, where the E-PDCCH is formed by E-CCEs (enhanced control channel element).

However, in an LTE system, a resource unit for carrying an E-PDCCH is an RB pair (resource block pair). Each RB pair occupies 12 subcarriers in the frequency domain, and occupies one subframe, that is, two slots in the time domain. However, resources available to the E-PDCCH are a set of REs (resource element) except the PDCCH region and what is occupied by various RSs (reference signal) in each RB pair, where each RB pair can carry multiple E-CCEs. Because various RSs are distributed unevenly in the RB pair, the number of resources occupied by each E-CCE may differ or vary significantly, and the performance of the E-CCEs is imbalanced, which affects E-CCE scheduling or receiving performance.

SUMMARY

The present invention provides a control channel resource transmission method, a base station and a user equipment, which can ensure balance between performance of E-CCEs on a resource set in control channel resource transmission, and further ensure scheduling and receiving performance of the E-CCEs.

One aspect of the present invention provides a control channel resource transmission method, including:

mapping more than one enhanced control channel element E-CCE onto a resource set, where each E-CCE is mapped onto a corresponding first resource subset and a corresponding second resource subset respectively, the first resource subset occupies a first time domain symbol set in a time domain and occupies a first preset frequency domain subcarrier set in a frequency domain, and the second resource subset occupies a second time domain symbol set in a time domain and occupies a second preset frequency domain subcarrier set in a frequency domain, so that each E-CCE occupies a resource of the same size or a difference between sizes of resources occupied by the E-CCEs is less than a preset threshold, where the E-CCEs are carried on the resource set for transmission; and transmitting the resource set that carries the E-CCEs to a user equipment.

Another aspect of the present invention provides a control channel resource transmission method, including:

demodulating more than one enhanced control channel element E-CCE mapped onto a resource set, where the E-CCEs are demodulated on a first resource subset and a second resource subset corresponding to each E-CCE separately the first resource subset occupies a first time domain symbol set in a time domain and occupies a first preset frequency domain subcarrier set in a frequency domain, and the second resource subset occupies a second time domain symbol set in a time domain and occupies a second preset frequency domain subcarrier set in a frequency domain, so that each E-CCE occupies a resource of the same size or a difference between sizes of resources occupied by the E-CCEs is less than a preset threshold, where the E-CCEs are carried on the resource set for transmission; and receiving, according to the demodulated E-CCEs, the resource set that carries the E-CCEs and is transmitted by a base station.

Another aspect of the present invention provides a base station, including:

a mapping unit, configured to map more than one enhanced control channel element E-CCE onto a resource set, where each E-CCE is mapped onto a corresponding first resource subset and a corresponding second resource subset respectively, the first resource subset occupies a first time domain symbol set in a time domain and occupies a first preset frequency domain subcarrier set in a frequency domain, and the second resource subset occupies a second time domain symbol set in a time domain and occupies a second preset frequency domain subcarrier set in a frequency domain, so that each E-CCE. occupies a resource of the same size or a difference between sizes of resources occupied by the E-CCEs is less than a preset threshold, where the E-CCEs are carried on the resource set for transmission; and a transmitting unit, configured to transmit the resource set that carries the E-CCEs to a user equipment.

Another aspect of the present invention provides a user equipment, including:

a demodulating unit, configured to demodulate more than one enhanced control channel element E-CCE mapped onto a resource set, where the E-CCEs are demodulated on a first resource subset and a second resource subset corresponding to each E-CCE separately, the first resource subset occupies a first time domain symbol set in a time domain and occupies a first preset frequency domain subcarrier set in a frequency domain, and the second resource subset occupies a second time domain symbol set in a time domain and occupies a second preset frequency domain subcarrier set in a frequency domain, so that each E-CCE occupies a resource of the same size or a difference between sizes of resources occupied by the E-CCEs is less than a preset threshold, where the E-CCEs are carried on the resource set for transmission; and a receiving unit, configured to receive, according to the demodulated E-CCEs, the resource set that carries the E-CCEs and is transmitted by a base station.

According to the control channel resource transmission method, the base station and the user equipment provided in the present invention, the base station maps more than one E-CCE onto a corresponding first resource subset and a second resource subset respectively in a resource set, each first resource subset and each second resource subset occupy a specific region in a time domain and in a frequency domain, so that each E-CCE occupies a resource of the same size or a difference between sizes of resources occupied by the E-CCEs is less than a preset threshold; and the user equipment demodulates the E-CCEs on one resource set according to the same common rule, and receives the resource set. The base station presets the mapping location of each E-CCE according to the current system conditions, so that the resource occupied by each E-CCE is of the same or similar size, which ensures balance between performance of E-CCEs on a resource set in control channel resource transmission, and further ensures scheduling and receiving performance of the E-CCEs.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 1 is a schematic flowchart of a control channel resource transmission method according to an embodiment of the present invention;

FIG. 2 is a schematic structural diagram of reference signal distribution in a resource set in the prior art;

FIG. 3 is a schematic structural diagram of multiplexing multiple E-CCEs on one resource set according to an embodiment of the present invention;

FIG. 4 is a schematic flowchart of another control channel resource transmission method according to an embodiment of the present invention;

FIG. 7 is another schematic structural diagram of multiplexing multiple E-CCEs on one resource set according to an embodiment of the present invention;

FIG. 8 is a schematic flowchart of another control channel resource transmission method according to an embodiment of the present invention;

FIG. 9 is a schematic flowchart of another control channel resource transmission method according to an embodiment of the present invention;

FIG. 10 is a schematic structural diagram of a base station according to an embodiment of the present invention;

DESCRIPTION OF EMBODIMENTS

Figure 5:
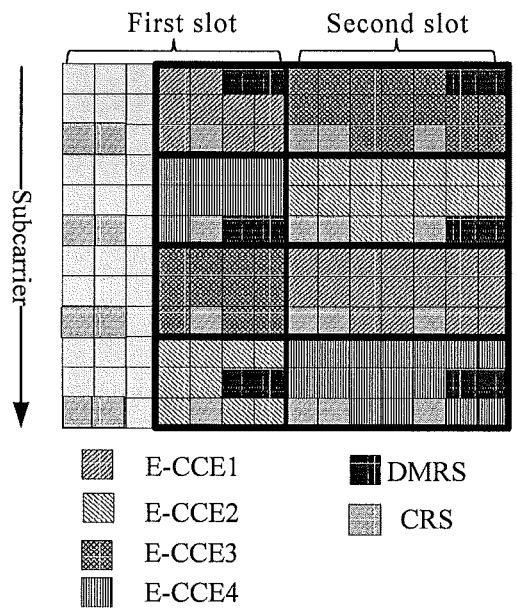
FIG. 5 is another schematic structural diagram of multiplexing multiple E-CCEs on one resource set according to an embodiment of the present invention.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

As shown in FIG. 1, a control channel resource transmission method provided in an embodiment of the present invention includes the following steps:

S101. A base station maps more than one E-CCE onto a resource set, where each E-CCE is mapped onto a corresponding first resource subset and a corresponding second resource subset respectively, the first resource subset occupies a first time domain symbol set in a time domain and occupies a first preset frequency domain subcarrier set in a frequency domain, and the second resource subset occupies a second time domain symbol set in the time domain and occupies a second preset frequency domain subcarrier set in the frequency domain, so that each E-CCE occupies a resource of the same size or a difference between sizes of resources occupied by the E-CCEs is less than a preset threshold, where the E-CCEs are carried on the resource set for transmission.

It should be noted that the base station sets the numbers and locations of subcarriers included in the first preset frequency domain subcarrier set and the second preset frequency domain subcarrier set of the two resource subsets of each E-CCE according to system configuration, actual transmission conditions, and distribution of different reference signals, so that each E-CCE mapped on a resource set occupies the same size of resource, or the difference between sizes of resources occupied by the E-CCEs is less than a preset threshold, for example, each E-CCE occupies an equal number of a RE or the difference between the numbers of a RE occupied by the E-CCEs is less than 5.

For example, when the base station needs to map and carry E-CCE 1 and E-CCE 2 onto a resource set such as an RB pair, where the RB pair includes RSs such as DMRS (demodulation reference signal) and CRS (cell-specific reference signal). If E-CCE 1 is placed onto subcarriers 1 to 6 simply and E-CCE 2 is placed onto subcarriers 7 to 12 simply, the number of REs occupied by E-CCE 1 is different from that occupied by E-CCE 2, as shown in FIG. 2. E-CCE 1 and E-CCE 2 may be mapped onto the RB pair diagonally to achieve balance between performance of E-CCEs and maximal closeness between the sizes of resources such as the numbers of REs occupied by the E-CCEs. As shown in FIG. 3, E-CCE 1 occupies subcarriers 1 to 6 on the first slot and subcarriers 7 to 12 on the second slot in the RE available to the E-PDCCH, and E-CCE 2 occupies subcarriers 7 to 12 on the first slot and subcarriers 1 to 6 on the second slot in the RE available to the E-PDCCH, where the RSs include a DMRS (demodulation reference signal) and a CRS (cell-specific reference signal). In this way, the number of REs occupied by mapped E-CCE 1 is equal to the number of REs occupied by mapped E-CCE 2.

S102. The base station transmits the resource set that carries the E-CCEs to a user equipment.

It should be noted that, the base station determines, according to the current transmission mode or a preset transmission rule, the number and locations of antenna ports used by each E-CCE in the current resource set, and transmits the corresponding E-CCE by using a preset antenna port, so that the user equipment also uses the DMRS corresponding to the transmitting antenna port to perform channel estimation for the channel used in demodulating the E-CCE.

According to the control channel resource transmission method provided in the embodiment of the present invention, a base station maps more than one E-CCE onto a corresponding first resource subset and a second resource subset respectively in a resource set, each first resource subset and each second resource subset occupy a specific region in a time domain and in a frequency domain, so that each E-CCE occupies a resource of the same size or a difference between sizes of resources occupied by the E-CCEs is less than a preset threshold; and a user equipment demodulates the E-CCEs on one resource set according to the same common rule, and receives the resource set. The base station presets the mapping location of each E-CCE according to the current system conditions, so that the resource occupied by each E-CCE is of the same or similar size, which ensures balance between performance of E-CCEs on a resource set in control channel resource transmission, and further ensures scheduling and receiving performance of the E-CCEs.

Another embodiment of the present invention provides a control channel resource mapping method. This embodiment is described by using an example where the resource set is a resource block pair RB pair, the first time domain symbol set occupied by the first resource subset when each E-CCE is mapped onto the corresponding first resource subset is the first slot, and the second time domain symbol set is the second slot, which, however, shall not constitute any limitation. As shown in FIG. 4, the method includes the following steps:

S201. A base station maps more than one E-CCE onto an RB pair, where each E-CCE is mapped onto a corresponding first resource subset and a corresponding second resource subset respectively, the first resource subset occupies a first time domain symbol set in a time domain, the first time domain symbol set is the first slot of the RB pair, a second preset subcarrier set belongs to the second slot of the RB pair, the first resource subset occupies a first preset frequency domain subcarrier set in a frequency domain, and the second resource subset occupies a second preset frequency domain subcarrier set in the frequency domain, where the first slot does not overlap the second slot, and the first preset frequency domain subcarrier set does not overlap the second preset frequency domain subcarrier set.

It should be noted that in an LTE system, the E-CCE is carried on the RE of the RB pair when being transmitted, and the E-CCEs make up the E-PDCCH, so that the size of resources occupied by each E-CCE may be obtained by comparing the number of REs occupied by each E-CCE. Due to a difference between the system configuration or the actual transmission conditions, the number of REs occupied by various RSs and the locations of the REs affect the number of REs occupied by each E-CCE. Therefore, in different systems, in determining the number of E-CCEs included in each RB pair, the locations and numbers of subcarriers occupied by different E-CCEs may be preset to ensure that each E-CCE occupies the same number of REs or the difference between the numbers of REs occupied by the E-CCEs is less than a preset threshold, and further ensure stable performance of the E-CCEs.

Figure 6:
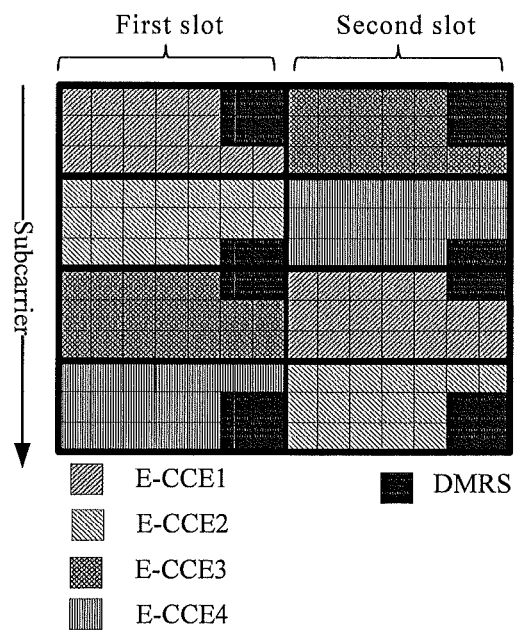
FIG. 6 is another schematic structural diagram of multiplexing multiple E-CCEs on one resource set according to an embodiment of the present invention.

For example, if four E-CCEs are multiplexed in each RB pair, the method shown in FIG. 5 and FIG. 6 can ensure that the four E-CCEs occupy the same or proximate number of REs.

As shown in FIG. 5, the number of REs occupied by the DMRS is 12, and the PDCCH region occupies the first three OFDM symbols of the first slot, and a CRS exists. According to the shown method, the four E-CCEs are denoted by E-CCE 1, E-CCE 2, E-CCE 3, and E-CCE 4, and are mapped onto an RB pair, where each E-CCE is mapped onto a corresponding first resource subset and a corresponding second resource subset, the first resource subset occupies a first slot in a time domain and occupies a first preset frequency domain subcarrier set in a frequency domain, and the second resource subset occupies a second slot in the time domain and occupies a second preset frequency domain subcarrier set in the frequency domain.

The first preset subcarrier set of E-CCE 1 is subcarriers 1 to 3 on the first slot in the RE available to the E-PDCCH, the second preset subcarrier set of E-CCE 1 is subcarriers 7 to 9 on the second slot, the first preset subcarrier set of E-CCE 2 is subcarriers 10 to 12 on the first slot in the RE available to the E-PDCCH, the second preset subcarrier set of E-CCE 2 is subcarriers 4 to 6 on the second slot, the first preset subcarrier set of E-CCE 3 is subcarriers 7 to 9 on the first slot in the RE available to the E-PDCCH, the second preset subcarrier set of E-CCE 3 is subcarriers 1 to 3 on the second slot, the first preset subcarrier set of E-CCE 4 is subcarriers 4 to 6 on the first slot in the RE available to the E-PDCCH, and the second preset subcarrier set of E-CCE 4 is subcarriers 10 to 12 on the second slot. According to the figure, it is easy to calculate that the number of REs occupied by E-CCE 1 and E-CCE 3 mapped in such a manner is 27, and the number of REs occupied by E-CCE 2 and E-CCE 4 is 25. Assuming that a difference between the numbers of REs occupied by the E-CCEs is less than a threshold 5, evidently the numbers of REs occupied by the E-CCEs are close to each other and the performance is relatively balanced.

Alternatively, as shown in FIG. 6, the number of REs occupied by the DMRS is 24, and there is no PDCCH region. According to the shown method, the four E-CCEs are mapped onto the RB pair, and still denoted by E-CCE 1, E-CCE 2, E-CCE 3, and E-CCE4.

The first preset subcarrier set of E-CCE 1 is subcarriers 1 to 3 on the first slot in the RE available to the E-PDCCH, the second preset subcarrier set of E-CCE 1 is subcarriers 7 to 9 on the second slot, the first preset subcarrier set of E-CCE 2 is subcarriers 10 to 12 on the first slot in the RE available to the E-PDCCH, the second preset subcarrier set of E-CCE 2 is subcarriers 4 to 6 on the second slot, the first preset subcarrier set of E-CCE 3 is subcarriers 7 to 9 on the first slot in the RE available to the E-PDCCH, the second preset subcarrier set of E-CCE 3 is subcarriers 1 to 3 on the second slot, the first preset subcarrier set of E-CCE 4 is subcarriers 4 to 6 on the first slot in the RE available to the E-PDCCH, and the second preset subcarrier set of E-CCE 4 is subcarriers 10 to 12 on the second slot. Through calculation, it is evident that the numbers of REs occupied by E-CCE 1, E-CCE 2, E-CCE 3, and E-CCE4 mapped in such a manner are equal.

As can be seen, the method of mapping E-CCE 1 to E-CCE 4 onto different subcarriers of the RB pair on the first slot and the second slot separately accomplishes equal or similar numbers of REs occupied by E-CCE 1 to E-CCE 4, and the mapping method is simple, so that the transmission performance is relatively balanced between E-CCE 1 and E-CCE 2. In the above example, the mapping method includes only four E-CCEs, but a mapping method may also include three E-CCEs, and the location of time-frequency resources actually occupied by the reference signal may also change to some extent, as shown in FIG. 7. However, the present invention is not limited to the figure, and the technical solution of the present invention is applicable only if the first preset frequency domain subcarrier set mapped from each E-CCE does not overlap the second preset frequency domain subcarrier set at all, the first time domain symbol set mapped from each E-CCE does not overlap the second time domain symbol set, and the number of subcarriers occupied by the first preset frequency domain subcarrier set and the number of subcarriers occupied by the second preset frequency domain subcarrier set are respectively preset according to the system configuration and the distribution conditions of reference signals RSs under actual transmission conditions, so as to ensure that the number of REs occupied by each E-CCE is the same or the difference between the numbers of REs occupied by the E-CCEs is less than a preset threshold.

S202. The base station transmits an RB pair that carries the E-CCEs to a user equipment.

Further, the base station transmits, by using a single antenna port, or multi-antenna multiplexing or space diversity, an RB pair that carries the E-CCEs to the user equipment, and the difference lies in that the antenna port used by each E-CCE that makes up the E-PDCCH is set according to different system configurations and the actual transmission conditions, for example, a corresponding antenna port is preset for each E-CCE on ports 7 to 10.

For example, the RB pair includes two E-CCEs, denoted by E-CCE 1 and E-CCE 2.

For example, the current E-PDCCH is transmitted by using a single antenna port. Therefore, port 7, which is an antenna port of the E-CCE transmitted in the location of the time-frequency resource occupied by E-CCE 1, is used as a preset port for transmitting E-CCE 1; and, port 8, which is an antenna port of the E-CCE transmitted in the location of the time-frequency resource occupied by E-CCE 2, is used as a preset port for transmitting E-CCE 2. The converse is also appropriate, that is, port 8 is used for E-CCE 1, and port 7 is used for E-CCE 2.

If the E-PDCCH on the current RB pair is transmitted by using multi-antenna multiplexing, port 7 and port 8 of the E-CCEs transmitted in the location of the time-frequency resource occupied by E-CCE 1 are used as preset ports for transmitting E-CCE 1; and, port 9 and port 10 of the E-CCEs transmitted in the location of the time-frequency resource occupied by E-CCE 2 are used as preset ports for transmitting E-CCE 2. The converse is also appropriate, that is, port 9 and port 10 are used for E-CCE 1, and port 7 and port 8 are used for E-CCE 2. Alternatively, port 7 and port 9 of the E-CCEs transmitted in the location of the time-frequency resource occupied by E-CCE 1 are used as preset ports for transmitting E-CCE 1; and port 8 and port 10 of the E-CCEs transmitted in the location of the time-frequency resource occupied by E-CCE 2 are used as preset ports for transmitting E-CCE 2.

If the current E-PDCCH is transmitted by using space diversity, that is, each E-CCE needs to be transmitted by using N antenna ports, where N≥2. For example, if each E-CCE needs to be transmitted by using two antenna ports, port 7 and port 8 of the E-CCEs transmitted in the location of the time-frequency resource occupied by E-CCE 1 are used as two preset ports for transmitting E-CCE 1; and port 9 and port 10 of the E-CCEs transmitted in the location of the time-frequency resource occupied by E-CCE 2 are used as two preset ports for transmitting E-CCE 2; or, the port is set in other ways, for example, E-CCE 1 is transmitted by using port 8 and port 10, and E-CCE 2 is transmitted by using port 7 and port 9. The converse is also appropriate. The above selection of the antenna ports is only an example, and shall not constitute any limitation.

Alternatively, if the current E-PDCCH is transmitted by using space diversity, in the location of the time-frequency resource for transmitting the E-CCE in the entire RB pair, two fixed preset ports may be always used for transmission. For example, port 7 and port 8 are preset ports fixedly, and both E-CCE 1 and E-CCE 2 are transmitted by using port 7 and port 8; or, in the location of the time-frequency resource for transmitting the E-CCE in the entire RB pair, port 7 and port 9 may be always used as fixed preset ports.

Further, the RB pair may also include four E-CCEs, denoted by E-CCE 1, E-CCE 2, E-CCE 3, and E-CCE 4.

Therefore, if the current E-PDCCH is transmitted by using a single antenna port, port 7 of the E-CCE transmitted in the location of the time-frequency resource occupied by E-CCE 1 is used as a preset port for transmitting E-CCE 1; similarly, E-CCE 2 is transmitted by using port 8, E-CCE 3 is transmitted by using port 9, and E-CCE 4 is transmitted by using port 10. It should be noted that the one-to-one mapping relationships of ports 7 to 10 occupied by E-CCE 1 to E-CCE 4 may change randomly without being limited.

The current E-PDCCH may also be transmitted by using space diversity, that is, each E-CCE needs to be transmitted by using two antenna ports. Therefore, in the location of the time-frequency resource for transmitting the E-CCE in the entire RB pair, port 7 and port 8 are always used for transmission, that is, port 7 and port 8 are used as two fixed preset ports for transmitting E-CCE 1, E-CCE 2, E-CCE 3, and E-CCE 4. Similarly, in the location of the time-frequency resource for transmitting the E-CCE in the entire RB pair, port 7 and port 9 may be always used for transmission, which shall not constitute any limitation.

According to the control channel resource transmission method provided in the embodiment of the present invention, a base station maps more than one E-CCE onto a corresponding first resource subset and a second resource subset respectively in a resource set, each first resource subset and each second resource subset occupy a specific region in a time domain and in a frequency domain, so that each E-CCE occupies a resource of the same size or a difference between sizes of resources occupied by the E-CCEs is less than a preset threshold; and a user equipment demodulates the E-CCEs on one resource set according to the same common rule, and receives the resource set. The base station presets the mapping location of each E-CCE according to the current system conditions, so that the resource occupied by each E-CCE is of the same or similar size, which ensures balance between performance of E-CCEs on a resource set in control channel resource transmission, and further ensures scheduling and receiving performance of the E-CCEs.

As shown in FIG. 8, a control channel resource mapping method provided in another embodiment of the present invention includes the following steps:

S301. A user equipment demodulates more than one E-CCE mapped onto a resource set, where the E-CCEs are demodulated on a first resource subset and a second resource subset corresponding to each E-CCE separately, the first resource subset occupies a first time domain symbol set in a time domain and occupies a first preset frequency domain subcarrier set in a frequency domain, and the second resource subset occupies a second time domain symbol set in the time domain and occupies a second preset frequency domain subcarrier set in the frequency domain, so that each E-CCE occupies a resource of the same size or a difference between sizes of resources occupied by the E-CCEs is less than a preset threshold, where the E-CCEs are carried on the resource set for transmission.

It should be noted that a user equipment demodulates the E-CCE according to the system configuration, the actual transmission conditions, and the same rule that is mutually known by a base station, such as the number and distribution of mutually known E-CCEs, and distribution of various RSs, where the mutually known rule has been detailed in the mapping method in the foregoing embodiment and is not repeated here any further.

S302. The user equipment receives, according to the demodulated E-CCEs, the resource set that carries the E-CCEs and is transmitted by the base station.

Further, the base station determines, according to the current transmission mode and a preset transmission rule, the antenna ports used by each E-CCE in the current resource set, and transmits the corresponding E-CCE by using a preset antenna port, so that the user equipment also uses the DMRS corresponding to the transmitting antenna port to perform channel estimation for the channel used in demodulating the E-CCE.

According to the control channel resource transmission method provided in the embodiment of the present invention, a base station maps more than one E-CCE onto a corresponding first resource subset and a second resource subset respectively in a resource set, each first resource subset and each second resource subset occupy a specific region in a time domain and in a frequency domain, so that each E-CCE occupies a resource of the same size or a difference between sizes of resources occupied by the E-CCEs is less than a preset threshold; and a user equipment demodulates the E-CCEs on one resource set according to the same common rule, and receives the resource set. The base station presets the mapping location of each E-CCE according to the current system conditions, so that the resource occupied by each E-CCE is of the same or similar size, which ensures balance between performance of E-CCEs on a resource set in control channel resource transmission, and further ensures scheduling and receiving performance of the E-CCEs.

Another embodiment of the present invention provides a control channel resource mapping method. In this embodiment, it is assumed that the resource set is an RB pair, which, however, shall not constitute any limitation. As shown in FIG. 9, the method includes the following steps:

S401. A user equipment demodulates each corresponding E-CCE on a first resource subset and a second resource subset corresponding to each E-CCE respectively in an RB pair, where a first preset frequency domain subcarrier set belongs to the first slot of the resource set, the first resource subset occupies the first slot of the RB pair in a time domain and occupies the first preset frequency domain subcarrier set in a frequency domain, the second resource subset occupies the second slot of the RB pair in the time domain and occupies the second preset frequency domain subcarrier set in the frequency domain, the first preset frequency domain subcarrier set does not overlap the second preset frequency domain subcarrier set, the first slot does not overlap the second slot, and the E-CCE is carried on the RB pair for transmission.

For example, if a base station performs transmission by using a single antenna port and by using port 7, which is an antenna port of the E-CCE transmitted in the location of the time-frequency resource occupied by E-CCE 1, as a preset port for transmitting E-CCE 1, correspondingly, the user equipment uses a DMRS corresponding to port 7 to perform channel estimation for the channel used in demodulating E-CCE 1. If the base station performs transmission by using port 8 of the E-CCE transmitted in the location of the time-frequency resource occupied by E-CCE 2 as a preset port for transmitting E-CCE 2, correspondingly, the user equipment uses a DMRS corresponding to port 8 to perform channel estimation for the channel used in demodulating E-CCE 2. The converse is also appropriate, that is, port 8 is used for E-CCE 1, and port 7 is used for E-CCE 2.

If the base station performs transmission by using multi-antenna multiplexing and by using port 7 and port 8 of the E-CCEs transmitted in the location of the time-frequency resource occupied by E-CCE 1 as preset ports for transmitting E-CCE 1, correspondingly, the user equipment uses a DMRS corresponding to port 7 and port 8 to perform channel estimation for the channel used in demodulating E-CCE 1. If the base station performs transmission by using port 9 and port 10 of the E-CCEs transmitted in the location of the time-frequency resource occupied by E-CCE 2 as preset ports for transmitting E-CCE 2, correspondingly, the user equipment uses a DMRS corresponding to port 9 and port 10 to perform channel estimation for the channel used in demodulating E-CCE 2. The converse is also appropriate, that is, port 9 and port 10 are used for E-CCE 1, and port 7 and port 8 are used for E-CCE 2.

If the base station performs transmission by using space diversity, in which each E-CCE needs to be transmitted by using at least two antenna ports, for example, if each E-CCE needs to be transmitted by using two antenna ports and the base station uses port 7 and port 8 of the E-CCEs transmitted in the location of the time-frequency resource occupied by E-CCE 1 as two preset ports for transmitting E-CCE 1, correspondingly, the user equipment uses the DMRS corresponding to port 7 and port 8 to perform channel estimation for the channel used in demodulating E-CCE 1. If the base station uses port 9 and port 10 of the E-CCEs transmitted in the location of the time-frequency resource occupied by E-CCE 2 as two preset ports for transmitting E-CCE 2, correspondingly, the user equipment uses the DMRS corresponding to port 9 and port 10 to perform channel estimation for the channel used in demodulating E-CCE 2.

Alternatively, the base station performs transmission by using space diversity and always by using two fixed preset ports such as fixed port 9 and port 10 in the location of the time-frequency resource for transmitting the E-CCE in the entire RB pair, correspondingly, the user equipment uses the DMRS corresponding to port 9 and port 10 to perform channel estimation for the channel used in demodulating information transmitted on the time-frequency resource.

It should be noted that the user equipment demodulates the mapped E-CCE by using a preset rule that is mutually known by the base station, so that the mapping location of the E-CCE is consistent with that in the preset method of the base station, which is not repeated here any further.

S402. The user equipment receives, according to the demodulated E-CCEs, the RB pair that carries the E-CCEs and is transmitted by the base station.

According to the control channel resource transmission method provided in the embodiment of the present invention, a base station maps more than one E-CCE onto a corresponding first resource subset and a second resource subset respectively in a resource set, each first resource subset and each second resource subset occupy a specific region in a time domain and in a frequency domain, so that each E-CCE occupies a resource of the same size or a difference between sizes of resources occupied by the E-CCEs is less than a preset threshold; and a user equipment demodulates the E-CCEs on one resource set according to the same common rule, and receives the resource set. The base station presets the mapping location of each E-CCE according to the current system conditions, so that the resource occupied by each E-CCE is of the same or similar size, which ensures balance between performance of E-CCEs on a resource set in control channel resource transmission, and further ensures scheduling and receiving performance of the E-CCEs.

As shown in FIG. 10, a base station 50 provided in an embodiment of the present invention includes:

a mapping unit 501, configured to map more than one E-CCE onto a resource set, where each E-CCE is mapped onto a corresponding first resource subset and a corresponding second resource subset respectively, the first resource subset occupies a first time domain symbol set in a time domain and occupies a first preset frequency domain subcarrier set in a frequency domain, and the second resource subset occupies a second time domain symbol set in the time domain and occupies a second preset frequency domain subcarrier set in the frequency domain, so that each E-CCE occupies a resource of the same size or a difference between sizes of resources occupied by the E-CCEs is less than a preset threshold, where the E-CCEs are carried on the resource set for transmission; and a transmitting unit 502, configured to transmit the resource set that carries the E-CCEs to a user equipment.

Further, the transmitting unit 502 is specifically configured to transmit, by using a single antenna port, the resource set, on which the E-CCEs are mapped, to the user equipment 60, where each E-CCE is transmitted by using a unique preset port respectively;

or configured to transmit, by using multi-antenna multiplexing, the resource set to the user equipment 60, where the E-PDCCH formed by the E-CCEs is mapped onto the resource set, and each E-CCE is transmitted by using more than one preset port respectively;

or configured to use space diversity to transmit the resource set to the user equipment 60, where the E-PDCCH formed by the E-CCEs is mapped onto the resource set, and each E-CCE is transmitted by using two preset ports respectively or all the E-CCEs are transmitted by using two fixed preset ports.

The base station 50 may work according to the method provided in the foregoing embodiments, and the working method is the same as the method provided in the foregoing embodiments and is not repeated here any further.

According to the base station provided in the embodiment of the present invention, the base station maps more than one E-CCE onto a corresponding first resource subset and a second resource subset respectively in a resource set, each first resource subset and each second resource subset occupy a specific region in a time domain and in a frequency domain, so that each E-CCE occupies a resource of the same size or a difference between sizes of resources occupied by the E-CCEs is less than a preset threshold, so that a user equipment demodulates the E-CCEs on one resource set according to the same common rule, and receives the resource set. The base station presets the mapping location of each E-CCE according to the current system conditions, so that the resource occupied by each E-CCE is of the same or similar size, which ensures balance between performance of E-CCEs on a resource set in control channel resource transmission, and further ensures scheduling and receiving performance of the E-CCEs.

Figure 11:
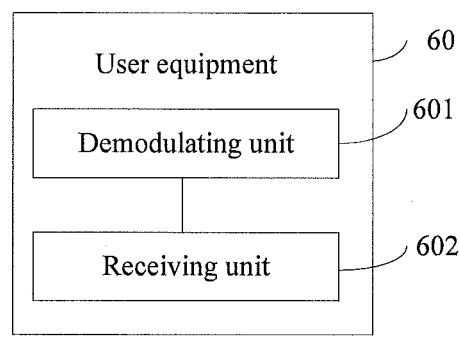
FIG. 11 is a schematic structural diagram of a user equipment according to an embodiment of the present invention.

As shown in FIG. 11, a user equipment 60 provided in an embodiment of the present invention includes:

a demodulating unit 601, configured to demodulate more than one E-CCE mapped onto a resource set, where the E-CCEs are demodulated on a first resource subset and a second resource subset corresponding to each E-CCE separately, the first resource subset occupies a first time domain symbol set in a time domain and occupies a first preset frequency domain subcarrier set in a frequency domain, and the second resource subset occupies a second time domain symbol set in the time domain and occupies a second preset frequency domain subcarrier set in the frequency domain, so that each E-CCE occupies a resource of the same size or a difference between sizes of resources occupied by the E-CCEs is less than a preset threshold, where the E-CCEs are carried on the resource set for transmission; and a receiving unit 602, configured to receive, according to the demodulated E-CCEs, the resource set that carries the E-CCEs and is transmitted by a base station.

For example, the demodulating unit 601 is specifically configured to perform demodulation by using a unique preset port of each E-CCE respectively; and the receiving unit 602 is specifically configured to receive, according to the E-CCEs demodulated by using a single antenna port, the resource set transmitted by the base station 50, where an E-PDCCH formed by the E-CCEs is mapped onto the resource set.

Alternatively, the demodulating unit 601 is specifically configured to perform demodulation by using more than one preset port of each E-CCE respectively; and the receiving unit 602 is specifically configured to receive, according to the E-CCEs demodulated by using multi-antenna multiplexing, the resource set transmitted by the base station 50, where an E-PDCCH formed by the E-CCEs is mapped onto the resource set.

Alternatively, the demodulating unit 601 is specifically configured to demodulate each E-CCE by using two preset ports of each E-CCE respectively or demodulate all the E-CCEs by using two fixed preset ports; and the receiving unit 602 is specifically configured to receive, according to the E-CCEs demodulated by using space diversity, the resource set transmitted by the base station 50, where an E-PDCCH formed by the E-CCEs is mapped onto the resource set.

Figure 12:
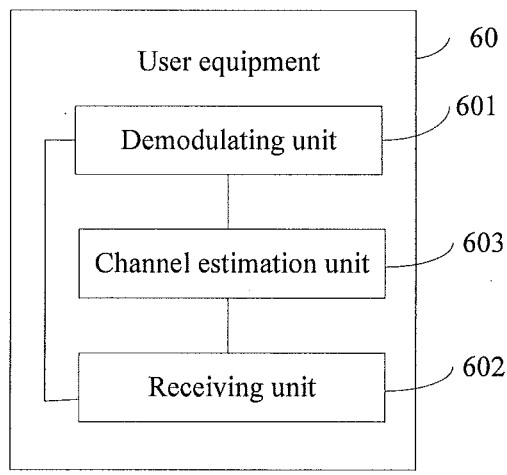
FIG. 12 is a schematic structural diagram of another user equipment according to an embodiment of the present invention.

Further, as shown in FIG. 12, the user equipment 60 further includes:

a channel estimation unit 603, configured to: before the receiving unit receives the resource set that carries the E-CCEs and is transmitted by the base station, perform channel estimation by using a demodulation reference signal DMRS corresponding to the preset port used by the demodulating unit in demodulating each E-CCE.

The user equipment 60 may work according to the method provided in the foregoing embodiments, and the working method is the same as the method provided in the foregoing embodiments and is not repeated here any further.

According to the base station provided in the embodiment of the present invention, the base station maps more than one E-CCE onto a corresponding first resource subset and a second resource subset respectively in a resource set, each first resource subset and each second resource subset occupy a specific region in a time domain and in a frequency domain, so that each E-CCE occupies a resource of the same size or a difference between sizes of resources occupied by the E-CCEs is less than a preset threshold, so that a user equipment demodulates the E-CCEs on one resource set according to the same common rule, and receives the resource set. The base station presets the mapping location of each E-CCE according to the current system conditions, so that the resource occupied by each E-CCE is of the same or similar size, which ensures balance between performance of E-CCEs on a resource set in control channel resource transmission, and further ensures scheduling and receiving performance of the E-CCEs.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A control channel resource transmission method, comprising:

mapping more than one enhanced control channel element (E-CCE) onto a resource set, the resource set including a resource block pair in a first slot and a second slot, wherein each E-CCE is mapped onto a first resource subset of the resource set occupying a first time domain symbol set in a time domain of the first slot and a second resource subset of the resource set, wherein the second resource subset of the resource set occupies a second time domain symbol set in the time domain of the second slot and occupies a frequency domain subcarrier set in a frequency domain of the first slot subsequent to a frequency domain subcarrier set occupied by the first resource subset, so that each E-CCE mapped onto the resource set occupies a resource of the same size or a difference between sizes of resources occupied by the E-CCEs is less than a preset threshold, wherein the E-CCEs are carried on the resource set for transmission; and transmitting the resource set that carries the E-CCEs to a user equipment, wherein the frequency domain subcarrier set of the first resource subset does not overlap the frequency domain subcarrier set of the second resource subset.

2. The method according to claim 1, wherein the first time domain symbol set of the first resource subset does not overlap the second time domain symbol set of the second resource subset.

3. The method according to claim 1, wherein a number of a subcarrier comprised in the frequency domain subcarrier set of the first resource subset and a number of a subcarriers comprised in the frequency domain subcarrier set of the second resource subset are set respectively according to distribution of a reference signal RS of a current system in the resource set.

4. The method according to claim 1, wherein the transmitting the resource set that carries the E-CCEs to a user equipment comprises:

transmitting, by using space diversity, the resource set that carries the E-CCEs to the user equipment, wherein all the E-CCEs are transmitted by using port 7 and port 9.

5. A control channel resource transmission method, comprising:

demodulating more than one enhanced control channel element (E-CCE) mapped onto a resource set, the resource set including a resource block pair in a first slot and a second slot, wherein the E-CCEs are demodulated on a first resource subset of the resource set occupying a first time domain symbol set in a time domain of the first slot and a second resource subset of the resource set, wherein the second resource subset of the resource set occupies a second time domain symbol set in the time domain of the second slot and occupies a frequency domain subcarrier set in a frequency domain of the first slot subsequent to a frequency domain subcarrier set occupied by the first resource subset, so that each E-CCE mapped onto the resource set occupies a resource of the same size or a difference between sizes of resources occupied by the E-CCEs is less than a preset threshold, wherein the E-CCEs are carried on the resource set for transmission; and receiving, according to the demodulated E-CCEs, the resource set that carries the E-CCEs and is transmitted by a base station, wherein the frequency domain subcarrier set of the first resource subset does not overlap the frequency domain subcarrier set of the second resource subset.

6. The method according to claim 5, wherein the first time domain symbol set of the first resource subset does not overlap the second time domain symbol set of the second resource subset.

7. The method according to claim 5, wherein a number of a subcarrier comprised in the frequency domain subcarrier set of the first resource subset and a number of a subcarrier comprised in the frequency domain subcarrier set of the second resource subset are determined respectively according to distribution of a reference signal RS of a current system in the resource set.

8. The method according to claim 5, wherein the receiving, according to the demodulated E-CCEs, the resource set that carries the E-CCEs and is transmitted by a base station, comprises:

receiving, according to the E-CCEs demodulated by using space diversity, the resource set that carries the E-CCEs and is transmitted by the base station, wherein all the E-CCEs are demodulated by using port 7 and port 9.

9. A base station, comprising:

a transmitter; and a processor configured to:

map more than one enhanced control channel element (E-CCE) onto a resource set, the resource set including a resource block pair in a first slot and a second slot, wherein each E-CCE is mapped onto a first resource subset of the resource set occupying a first time domain symbol set in a time domain of the first slot and a second resource subset of the resource set, wherein the second resource subset of the resource set occupies a second time domain symbol set in the time domain of the second slot and occupies a frequency domain subcarrier set in a frequency domain of the first slot subsequent to a frequency domain subcarrier set occupied by the first resource subset, so that each E-CCE mapped onto the resource set occupies a resource of the same size or a difference between sizes of resources occupied by the E-CCEs is less than a preset threshold, wherein the E-CCEs are carried on the resource set for transmission, and the transmitter is configured to transmit the resource set that carries the E-CCEs to a user equipment, wherein the frequency domain subcarrier set of the first resource subset does not overlap the frequency domain subcarrier set of the second resource subset.

10. The base station according to claim 9, wherein the first time domain symbol set of the first resource subset does not overlap the second time domain symbol set of the second resource subset.

11. The base station according to claim 9, wherein a number of a subcarrier comprised in the frequency domain subcarrier set of the first resource subset and a number of a subcarriers comprised in the frequency domain subcarrier set of the second resource subset are set respectively according to distribution of a reference signal RS of a current system in the resource set.

12. The base station according to claim 9, wherein:

the transmitter is configured to use space diversity to transmit the resource set that carries the E-CCEs to the user equipment, wherein all the E-CCEs are transmitted by using port 7 and port 9.

13. A user equipment, comprising:

a receiver; and a processor configured to:

demodulate more than one enhanced control channel element (E-CCE) mapped onto a resource set, the resource set including a resource block pair in a first slot and a second slot, wherein the E-CCEs are demodulated on a first resource subset of the resource set occupying a first time domain symbol set in a time domain of the first slot and a second resource subset of the resource set, wherein the second resource subset of the resource set occupies a second time domain symbol set in the time domain of the second slot and occupies a frequency domain subcarrier set in the frequency domain of the first slot subsequent to a frequency domain subcarrier set occupied by the first resource subset, so that each E-CCE mapped onto the resource set occupies a resource of the same size or a difference between sizes of resources occupied by the E-CCEs is less than a preset threshold, wherein the E-CCEs are carried on the resource set for transmission, and wherein the receiver is configured to receive the resource set that carries the E-CCEs and is transmitted by a base station according to the demodulated E-CCEs, wherein the frequency domain subcarrier set of the first resource subset does not overlap the frequency domain subcarrier set of the second resource subset.

14. The user equipment according to claim 13, wherein the first time domain symbol set of the first resource subset does not overlap the second time domain symbol set of the second resource subset.

15. The user equipment according to claim 13, wherein a number of a subcarrier comprised in the frequency domain subcarrier set of the first resource subset and a number of a subcarrier comprised in the frequency domain subcarrier set of the second resource subset are determined respectively according to distribution of a reference signal RS of a current system in the resource set.

16. The user equipment according to claim 13, wherein:

the processor is configured to demodulate all the E-CCEs by using port 7 and port 9; and the receiver is configured to receive, according to the E-CCEs demodulated by using space diversity, the resource set that carries the E-CCEs and is transmitted by the base station.

* * * * *